US012024119B2

(12) United States Patent
Croley

(10) Patent No.: US 12,024,119 B2
(45) Date of Patent: Jul. 2, 2024

(54) THEFT BARRIER ASSEMBLY

(71) Applicant: Gayle Croley, Las Vegas, NV (US)

(72) Inventor: Gayle Croley, Las Vegas, NV (US)

( * ) Notice: Subject to any disclaimer, the term of this patent is extended or adjusted under 35 U.S.C. 154(b) by 0 days.

(21) Appl. No.: 17/983,204

(22) Filed: Nov. 8, 2022

(65) Prior Publication Data

US 2024/0149826 A1 May 9, 2024

(51) Int. Cl.
*B60R 25/00* (2013.01)
*F01N 13/18* (2010.01)

(52) U.S. Cl.
CPC .......... *B60R 25/00* (2013.01); *F01N 13/1822* (2013.01); *F01N 2260/22* (2013.01)

(58) Field of Classification Search
CPC .. B60R 25/00; F01N 13/1822; F01N 2260/22
USPC ....................................................... 248/551
See application file for complete search history.

(56) References Cited

U.S. PATENT DOCUMENTS

| | | | | |
|---|---|---|---|---|
| 4,688,824 A | * | 8/1987 | Herring ................... | B60R 21/34 |
| | | | | 293/38 |
| 4,877,266 A | * | 10/1989 | Lamparter ............ | B60R 19/565 |
| | | | | 293/118 |
| 7,188,875 B2 | * | 3/2007 | Norelius ................ | B60R 19/565 |
| | | | | 293/118 |
| 8,002,232 B2 | | 8/2011 | Meislahn | |
| 9,688,320 B2 | * | 6/2017 | Courtney ............. | B62D 35/001 |
| 10,549,797 B2 | * | 2/2020 | Ehrlich ................ | B62D 35/001 |
| 2014/0159419 A1 | * | 6/2014 | Baker .................. | B62D 35/001 |
| | | | | 296/180.4 |
| 2015/0123777 A1 | | 5/2015 | Potter | |
| 2019/0118750 A1 | * | 4/2019 | Bosco ..................... | B60R 19/54 |
| 2022/0198856 A1 | * | 6/2022 | Sobue ..................... | H04W 4/40 |

FOREIGN PATENT DOCUMENTS

WO    WO2021163383    8/2021

* cited by examiner

*Primary Examiner* — Muhammad Ijaz

(57) ABSTRACT

A theft barrier assembly includes a plurality of panels. Each panel is pivotally disposed on a bottom side of a vehicle. Each of the panels is positionable in a deployed position to inhibit a person from sliding beneath the vehicle. Each of the panels is positionable in a stored position to facilitate normal operation of the vehicle. Each of a pair of actuating units is movably disposed on the bottom of the vehicle and each of the actuating units urges respective panels into the deployed position and the stored position. A receiver is integrated into the vehicle and the receiver is in electrical communication with each of the actuating units. A remote control is in remote communication with the receiver for remotely controlling the actuating units.

9 Claims, 4 Drawing Sheets

THEFT BARRIER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to barrier devices and more particularly pertains to a new barrier device for inhibiting a person from sliding beneath a vehicle for vandalizing the vehicle. The device includes a plurality of panels that are hingedly disposed on the vehicle and a pair of actuating units for urging the panels between a deployed position and a retracted position. The device includes a remote control that is in remote communication with the actuating units for remotely controlling the actuating units.

(2) DESCRIPTION OF RELATED ART INCLUDING INFORMATION DISCLOSED UNDER 37 CFR 1.97 AND 1.98

The prior art relates to barrier devices including a guard device for a school bus including a flexible sheet that is extendable downwardly from a bottom of the school bus. The prior art discloses a vehicle safety device including a plurality of brushes that are movably disposed on a bottom of a vehicle and which are positionable in a deployed position for sweeping debris away from wheels of the vehicle. The prior art discloses a security cage that is mountable around a catalytic converter of a vehicle for inhibiting the catalytic converter from being stolen. The prior art discloses a semi trailer underride system including a skirt extending around a perimeter of a semi trailer which is deployed and retracted with a cable and pulley system. The prior art discloses a catalytic converter theft protection device that includes a metal cage positioned around a catalytic converter and a tampering alert integrated into the metal cage.

BRIEF SUMMARY OF THE INVENTION

An embodiment of the disclosure meets the needs presented above by generally comprising a plurality of panels that is each pivotally disposed on a bottom side of a vehicle. Each of the panels is positionable in a deployed position to inhibit a person from sliding beneath the vehicle. Each of the panels is positionable in a stored position to facilitate normal operation of the vehicle. A pair of actuating units is each movably disposed on the bottom of the vehicle and each of the actuating units urges respective panels into the deployed position and the stored position. A receiver is integrated into the vehicle and the receiver is in electrical communication with each of the actuating units. A remote control is in remote communication with the receiver for remotely controlling the actuating units.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
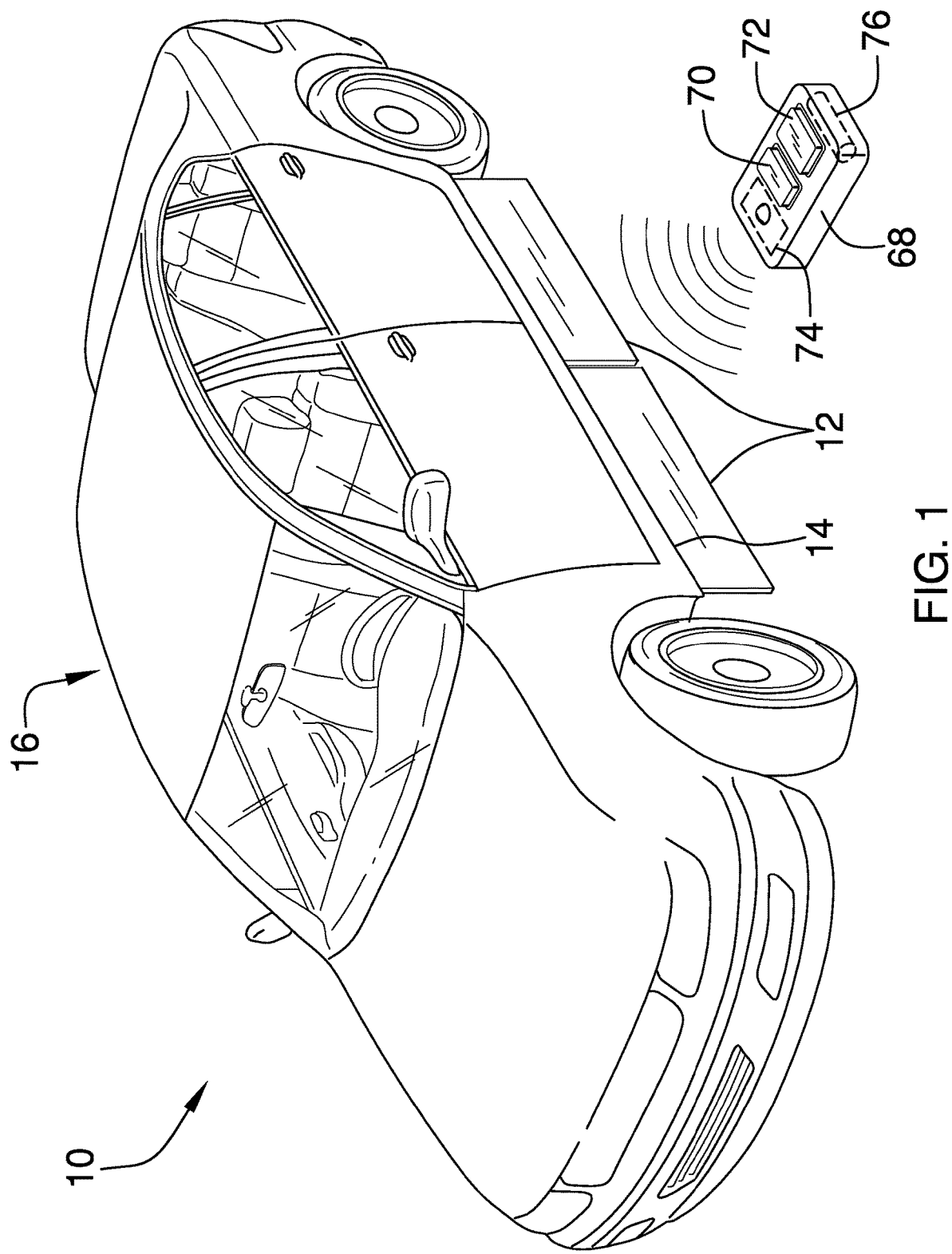
FIG. 1 is a perspective view of a theft barrier assembly according to an embodiment of the disclosure.
Figure 2:
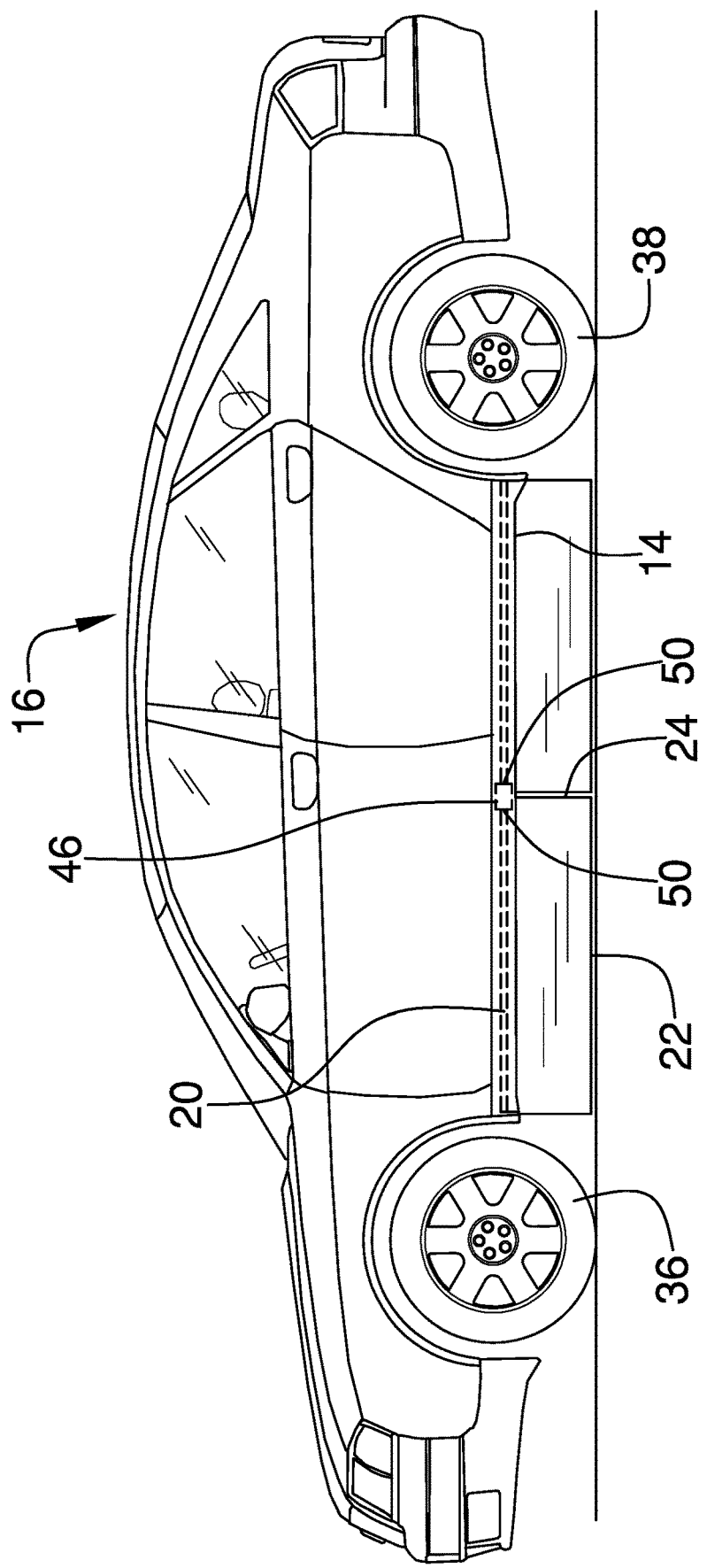
FIG. 2 is a right side view of an embodiment of the disclosure.
Figure 3:
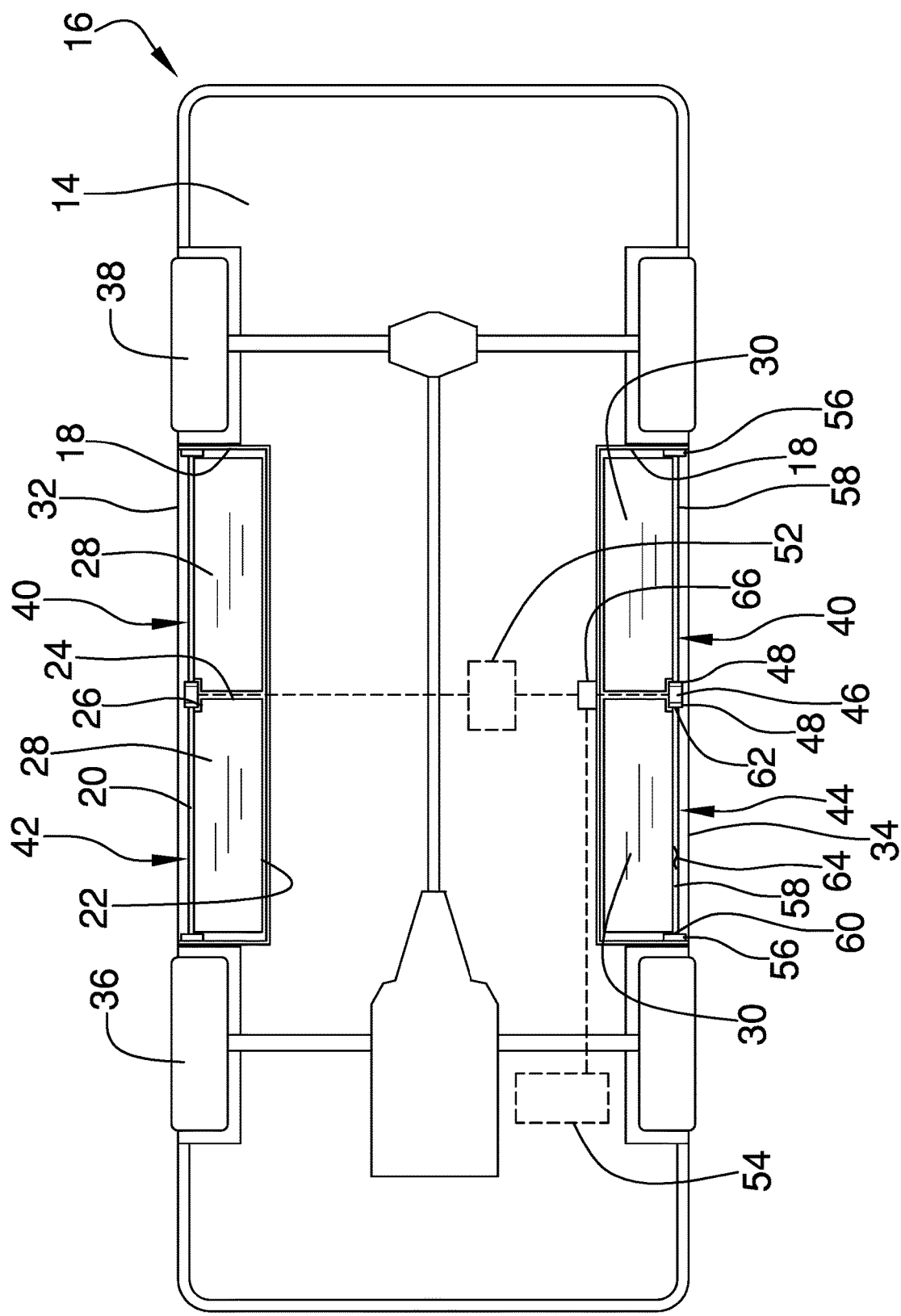
FIG. 3 is a bottom view of an embodiment of the disclosure.
Figure 4:
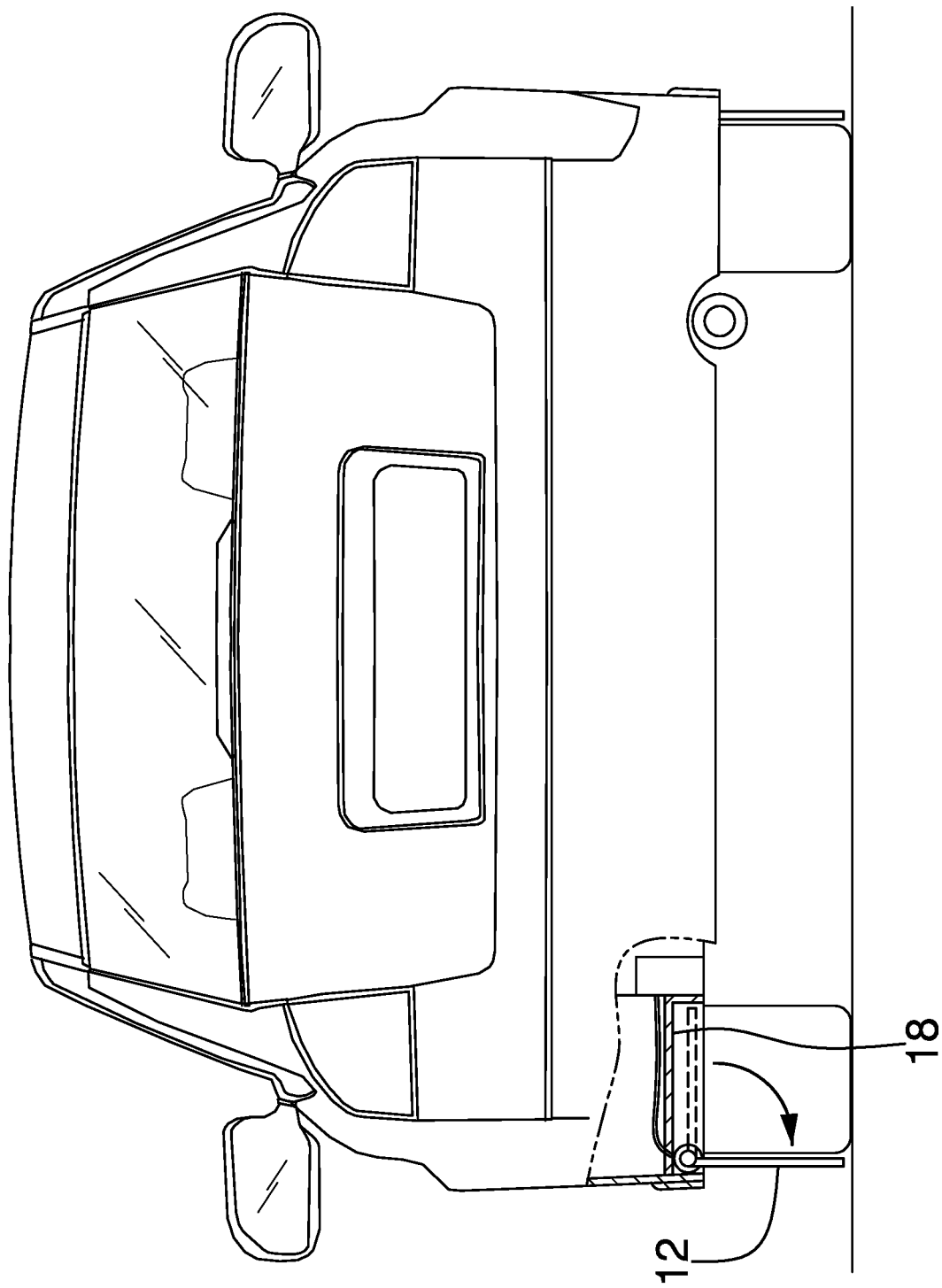
FIG. 4 is a back cut-away view of an embodiment of the disclosure.

With reference now to the drawings, and in particular to FIGS. 1 through 4 thereof, a new barrier device embodying the principles and concepts of an embodiment of the disclosure and generally designated by the reference numeral 10 will be described.

As best illustrated in FIGS. 1 through 4, the theft barrier assembly 10 generally comprises a plurality of panels 12 that is each of the panels 12 is pivotally disposed on a bottom side 14 of a vehicle 16. The vehicle 16 may comprise a passenger vehicle, a cargo vehicle of any other type of motorized vehicle that is driven on public roadways. Each of the panels 12 is positionable in a deployed position having each of the panels 12 extending downwardly from the bottom side 14 of the vehicle 16 to inhibit a person from sliding beneath the vehicle 16. Each of the panels 12 is positionable in a stored position having the panels 12 resting against the bottom side 14 of the vehicle 16 to facilitate normal operation of the vehicle 16. As is most clearly shown in FIG. 4, the bottom side 14 of the vehicle 16 may have a pair of recesses 18 that each accommodates respective ones of the panels 12 when the respective panels 12 are in the stored position.

Each of the panels 12 has a top edge 20, a lower edge 22 and lateral edge 24 and each of the panels 12 has a cut out 26 that is aligned with an intersection between the top edge 20 and the lateral edge 24. The plurality of panels 12 includes a set of first panels 28 and a second of second panels 30; each of the first panels 28 is disposed adjacent to a first lateral side 32 of the vehicle 16 and each of the second panels 30 is disposed adjacent to a second lateral side 34 of the vehicle 16. Each of the set of first panels 28 and the set of second panels 30 is positioned between a respective front tire 36 and a respective rear tire 38 of the vehicle 16. Each of the first panels 28 is oriented having the lateral edge 24 of each of the first panels 28 being directed toward each other such that the cut out 26 in each of the first panels 28 is aligned with each other. Additionally, each of the second panels 30 is oriented having the lateral edge 24 of each of the second panels 30 being directed toward each other such that the cut out 26 in each of the second panels 30 is aligned with each other.

A pair of actuating units 40 is provided and each of the actuating units 40 is movably disposed on the bottom side 14 of the vehicle 16 and each of the actuating units 40 is mechanically coupled to respective ones of the plurality of panels 12. Each of the actuating units 40 is actuatable in a first condition for urging the respective panels 12 into the deployed position. Each of the actuating units 40 is actuatable into a second condition for urging the respective panels 12 into the stored position. The pair of actuating units 40 includes a first actuating unit 42 and a second actuating unit 44; the first actuating unit 42 is associated with the pair of first panels 28 and the second actuating unit 44 is associated with the pair of second panels 30.

Each of the first actuating unit 42 and the second actuating unit 44 comprises a motor 46 that is attached to the bottom side 14 of the vehicle 16. The motor 46 associated with the first actuating unit 42 is positioned in the cut out 26 in the pair of first panels 28 and the motor 46 associated with the second actuating unit 44 is positioned in the cut out 26 in the pair of second panels 30. The motor 46 has a pair of outputs 48 each positioned on opposing ends 50 of the motor 46 with respect to each other. Additionally, the motor 46 associated with each of the first actuating unit 42 and the second actuating unit 44 may comprise a two direction electric motor or the like.

A control circuit 52 is integrated into the vehicle 16, the control circuit 52 is electrically coupled to the motor 46 and the control circuit 52 receives a deploy input and a retract input. The motor 46 rotates in a first direction when the control circuit 52 receives the deploy input and the motor 46 rotates in a second direction when the control circuit 52 receives the retract input. Furthermore, the control circuit 52 is electrically coupled to a power source 54 comprising an electrical system of the vehicle 16.

Each of the actuating units 40 includes a pair of bearings 56 that is each disposed on the bottom side 14 of the vehicle 16. Each of the bearings 56 associated with the first actuating unit 42 is positioned adjacent to a respective one of the first panels 28. Each of the bearings 56 associated with the second actuating unit 44 is positioned adjacent to a respective one of the second panels 30. Each of the actuating units 40 includes a pair of rods 58 that each has a first end 60, a second end 62 and an outer surface 64 extending between the first end 60 and the second end 62. The first end 60 of each of the rods 58 is rotatably integrated into a respective one of the bearings 56 and the second end 62 of each of the rods 58 is attached to a respective one of the outputs 48 of the motor 46. The top edge 20 of each of the first panels 28 is attached to the outer surface 64 of a respective one of the rods 58 associated with the first actuating unit 42.

Each of the first panels 28 is urged into the deployed position when the motor 46 associated with the first actuating unit 42 rotates in the first direction. Conversely, each of the first panels 28 is urged into the stored position when the motor 46 associated with the first actuating unit 42 rotates in the second direction. The top edge 20 of each of the second panels 30 is attached to the outer surface 64 of a respective one of the rods 58 associated with the second actuating unit 44. Each of the second panels 30 is urged into the deployed position when the motor 46 associated with the second actuating unit 44 rotates in the first direction. Conversely, each of the second panels 30 is urged into the stored position when the motor 46 associated with the second actuating unit 44 rotates in the second direction.

A receiver 66 is integrated into the vehicle 16 and the receiver 66 is in electrical communication with each of the actuating units 40. Additionally, the receiver 66 is electrically coupled to the control circuit 52. The receiver 66 may comprise a radio frequency receiver or the like and the receiver 66 may employ Bluetooth communication protocols. A remote control 68 is provided and the remote control 68 is in remote communication with the receiver 66. Each of the actuating units 40 is actuated into the first condition when the remote control 68 broadcasts a deploy command to the actuating units 40. Additionally, each of the actuating units 40 is actuated into the second condition when the remote control 68 broadcasts a retract command to the actuating units 40.

The remote control 68 comprises a deploy button 70 that is movably integrated into the remote control 68 and a retract button 72 is movably integrated into the remote control 68. A transmitter 74 is integrated into the remote control 68 and the transmitter 74 is electrically coupled to each of the deploy button 70 and the retract button 72. The transmitter 74 broadcasts the deploy command to the receiver 66 when the deploy button 70 is depressed. Furthermore, the control circuit 52 receives the deploy input when the receiver 66 receives the deploy command from the transmitter 74. The transmitter 74 broadcasts the retract command to the receiver 66 when the retract button 72 is depressed and the control circuit 52 receives the retract input when the receiver 66 receives the retract command from the transmitter 74. The transmitter 74 may comprise a radio frequency transmitter or the like and the transmitter 74 may employ Bluetooth communication protocols. A power supply 76 is integrated into the receiver 66, the power supply 76 is electrically coupled to the transmitter 74 and the power supply 76 comprises at least one battery 78.

In use, the deploy button 70 is depressed on the remote control 68 when the vehicle 16 is parked thereby facilitating each of the panels 12 to be urged into the deployed position. In this way the panels 12 inhibit an individual from sliding beneath the vehicle 16 for vandalizing the undercarriage of the vehicle 16 or from stealing components from the undercarriage. The retract button 72 is depressed on the remote control 68 to facilitate each of the panels 12 to be urged into the retracted position. In this way the panels 12 do not inhibit the vehicle 16 from being driven as it would normally be driven.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A theft barrier assembly for inhibiting a thief from accessing an underside of a vehicle, said assembly comprising:
   a plurality of panels, each of said panels being pivotally disposed on a bottom side of the vehicle, each of said panels being positionable in a deployed position having each of said panels extending downwardly from the bottom side of the vehicle wherein each panels is configured to inhibit a person from sliding beneath the vehicle, each of said panels being positionable in a stored position having said panels resting against the bottom side of the vehicle to facilitate normal operation of the vehicle;
   a pair of actuating units, each of said actuating units being movably disposed on the bottom of the vehicle, each of said actuating units being mechanically coupled to respective ones of said plurality of panels, each of said actuating units being actuatable in a first condition for urging said respective panels into said deployed position, each of said actuating units being actuatable into a second condition for urging said respective panels into said stored position;
   a receiver being integrated into the vehicle, said receiver being in electrical communication with each of said actuating units; and
   a remote control being in remote communication with said receiver, each of said actuating units being actuated into said first condition when said remote control broadcasts a deploy command to said actuating units, each of said actuating units being actuated into said second condition when said remote control broadcasts a retract command to said actuating units;
   wherein each of said panels has a top edge, a lower edge and lateral edge, each of said panels having a cut out being aligned with an intersection between said top edge and said lateral edge;
   wherein said plurality of panels includes a set of first panels and a second of second panels;
   wherein each of said first panels is disposed adjacent to a first lateral side of the vehicle;
   wherein each of said second panels is disposed adjacent to a second lateral side of the vehicle;
   wherein each of said set of first panels and said set of second panels is positioned between a respective front tire and a respective rear tire of the vehicle;
   wherein each of said first panels is oriented having said lateral edge of each of said first panels being directed toward each other such that said cut out in each of said first panels is aligned with each other; and
   wherein each of said second panels is oriented having said lateral edge of each of said second panels being directed toward each other such that said cut out in each of said second panels is aligned with each other.

2. The assembly according to claim 1, wherein said pair of actuating units includes a first actuating unit and a second actuating unit, said first actuating unit being associated with said pair of first panels, said second actuating unit being associated with said pair of second panels.

3. The assembly according to claim 2, wherein each of said first actuating units and said second actuating units comprises a motor being attached to the bottom of the vehicle, said motor associated with said first actuating unit being positioned in said cut out in said pair of first panels, said motor associated with said second actuating unit being positioned in said cut out in said pair of second panels, said motor having a pair of outputs being positioned on opposing ends of said motor with respect to each other.

4. The assembly according to claim 3, further comprising a control circuit being integrated into the vehicle, said control circuit being electrically coupled to said motor, said control circuit receiving a deploy input and a retract input, said motor rotating in a first direction when said control circuit receives said deploy input, said motor rotating in a second direction when said control circuit receives said retract input, said control circuit being electrically coupled to a power source comprising an electrical system of the vehicle.

5. The assembly according to claim 3, wherein each of said actuating units includes:
   a pair of bearings, each of said bearings being disposed on the bottom side of the vehicle, each of said bearings associated with said first actuating unit being positioned adjacent to a respective one of said first panels, each of said bearings associated with said second actuating unit being positioned adjacent to a respective one of said second panels; and
   a pair of rods, each of said rods having a first end, a second end and an outer surface extending between said first end and said second end, said first end of each of said rods being rotatably integrated into a respective one of said bearings, said second end of each of said rods being attached to a respective one of said outputs of said motor.

6. The assembly according to claim 5, wherein said top edge of each of said first panels is attached to said outer surface of a respective one of said rods associated with said first actuating unit, each of said first panels being urged into said deployed position when said motor associated with said first actuating unit rotates in a first direction, each of said first panels being urged into said stored position when said motor associated with said first actuating unit rotates in a second direction.

7. The assembly according to claim 5, wherein said top edge of each of said second panels is attached to said outer surface of a respective one of said rods associated with said second actuating unit, each of said second panels being urged into said deployed position when said motor associated with said second actuating unit rotates in said a first direction, each of said second panels being urged into said stored position when said motor associated with said second actuating unit rotates in said a second direction.

8. The assembly according to claim 4, wherein:
   said receiver is electrically coupled to said control circuit; and
   said remote control comprises:

a deploy button being movably integrated into said remote control;

a retract button being movably integrated into said remote control;

a transmitter being integrated into said remote control, said transmitter being electrically coupled to each of said deploy button and said retract button, said transmitter broadcasting said deploy command to said receiver when said deploy button is depressed, said control circuit receiving said deploy input when said receiver receives said deploy command from said transmitter, said transmitter broadcasting said retract command to said receiver when said retract button is depressed, said control circuit receiving said retract input when said receiver receives said retract command from said transmitter; and a power supply being integrated into said receiver, said power supply being electrically coupled to said transmitter, said power supply comprising at least one battery.

9. A theft barrier assembly for inhibiting a thief from accessing an underside of a vehicle, said assembly comprising:

a plurality of panels, each of said panels being pivotally disposed on a bottom side of the vehicle, each of said panels being positionable in a deployed position having each of said panels extending downwardly from the bottom side of the vehicle wherein each panels is configured to inhibit a person from sliding beneath the vehicle, each of said panels being positionable in a stored position having said panels resting against the bottom side of the vehicle to facilitate normal operation of the vehicle, each of said panels having a top edge, a lower edge and lateral edge, each of said panels having a cut out being aligned with an intersection between said top edge and said lateral edge, said plurality of panels including a set of first panels and a second of second panels, each of said first panels being disposed adjacent to a first lateral side of the vehicle, each of said second panels being disposed adjacent to a second lateral side of the vehicle, each of said set of first panels and said set of second panels being positioned between a respective front tire and a respective rear tire of the vehicle, each of said first panels being oriented having said lateral edge of each of said first panels being directed toward each other such that said cut out in each of said first panels is aligned with each other, each of said second panels being oriented having said lateral edge of each of said second panels being directed toward each other such that said cut out in each of said second panels is aligned with each other;

a pair of actuating units, each of said actuating units being movably disposed on the bottom of the vehicle, each of said actuating units being mechanically coupled to respective ones of said plurality of panels, each of said actuating units being actuatable in a first condition for urging said respective panels into said deployed position, each of said actuating units being actuatable into a second condition for urging said respective panels into said stored position, said pair of actuating units including a first actuating unit and a second actuating unit, said first actuating unit being associated with said pair of first panels, said second actuating unit being associated with said pair of second panels, each of said first actuating units and said second actuating units comprising:

a motor being attached to the bottom of the vehicle, said motor associated with said first actuating unit being positioned in said cut out in said pair of first panels, said motor associated with said second actuating unit being positioned in said cut out in said pair of second panels, said motor having a pair of outputs being positioned on opposing ends of said motor with respect to each other;

a control circuit being integrated into the vehicle, said control circuit being electrically coupled to said motor, said control circuit receiving a deploy input and a retract input, said motor rotating in a first direction when said control circuit receives said deploy input, said motor rotating in a second direction when said control circuit receives said retract input, said control circuit being electrically coupled to a power source comprising an electrical system of the vehicle;

a pair of bearings, each of said bearings being disposed on the bottom side of the vehicle, each of said bearings associated with said first actuating unit being positioned adjacent to a respective one of said first panels, each of said bearings associated with said second actuating unit being positioned adjacent to a respective one of said second panels; and a pair of rods, each of said rods having a first end, a second end and an outer surface extending between said first end and said second end, said first end of each of said rods being rotatably integrated into a respective one of said bearings, said second end of each of said rods being attached to a respective one of said outputs of said motor, said top edge of each of said first panels being attached to said outer surface of a respective one of said rods associated with said first actuating unit, each of said first panels being urged into said deployed position when said motor associated with said first actuating unit rotates in said first direction, each of said first panels being urged into said stored position when said motor associated with said first actuating unit rotates in said second direction, said top edge of each of said second panels being attached to said outer surface of a respective one of said rods associated with said second actuating unit, each of said second panels being urged into said deployed position when said motor associated with said second actuating unit rotates in said first direction, each of said second panels being urged into said stored position when said motor associated with said second actuating unit rotates in said second direction;

a receiver being integrated into the vehicle, said receiver being in electrical communication with each of said actuating units, said receiver being electrically coupled to said control circuit; and a remote control being in remote communication with said receiver, each of said actuating units being actuated into said first condition when said remote control broadcasts a deploy command to said actuating units, each of said actuating units being actuated into said second condition when said remote control broadcasts a retract command to said actuating units, said remote control comprising:

a deploy button being movably integrated into said remote control;

a retract button being movably integrated into said remote control;

a transmitter being integrated into said remote control, said transmitter being electrically coupled to each of said deploy button and said retract button, said transmitter broadcasting said deploy command to said receiver when said deploy button is depressed, said control circuit receiving said deploy input when said receiver receives said deploy command from said transmitter, said transmitter broadcasting said retract command to said receiver when said retract button is depressed, said control circuit receiving said retract input when said receiver receives said retract command from said transmitter; and a power supply being integrated into said receiver, said power supply being electrically coupled to said transmitter, said power supply comprising at least one battery.

\* \* \* \* \*